US000001009H

United States Statutory Invention Registration [19]

[11] Reg. Number: H1009

Prapas et al.

[43] Published: Jan. 7, 1992

[54] SMOKE GRENADE LAUNCHER

[75] Inventors: Demetrios K. Prapas, Edgewood; Michael J. Burnham, Kingsville; Ronald E. Rhea, Bel Air; William G. Rouse, Aberdeen; Mark T. Radovich, Bel Air, all of Md.

[73] Assignee: The United States of America as represented by the Secretary of the Army, Washington, D.C.

[21] Appl. No.: 661,351

[22] Filed: May 17, 1991

[51] Int. Cl.[5] ..... F41A 23/34

[52] U.S. Cl. ..... 89/36.08; 89/1.3

*Primary Examiner*—David H. Brown

*Attorney, Agent, or Firm*—Anthony T. Lane; Edward Goldberg; Michael C. Sachs

[57] ABSTRACT

A smoke grenade system for use on an armored vehicle. This system includes a vehicle having a body and a turret, launching tubes mounted on the two sides of the turret, a first switch for expelling a first salvo of smoke grenades and a second switch for expelling a second salvo of smoke grenades. Each switch actuates one-half of the launching tubes on one side of the vehicle plus one-half of the launching tubes on the other side of the vehicle.

8 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SMOKE GRENADE LAUNCHER

GOVERNMENTAL INTEREST

The invention described herein may be manufactured, used, and licensed by or for the Government for governmental purposes without the payment to us of any royalty thereon.

FIELD OF THE INVENTION

The invention generally relates to a smoke grenade launch system and in particular the invention relates to a multi-salvo smoke grenade launch system having left and right launchers, each having a plurality of similar launch tube subassemblies.

BACKGROUND OF THE INVENTION

A first prior art smoke grenade launch system is a single-salvo smoke grenade launch system. A second prior art launch system, which is a dual salvo launch system, is relatively small in capacity.

One problem with the first prior art smoke grenade launch system is that crew members must come out of their protective vehicle, in order to reload the launch system after a firing of one salvo. One problem with the second prior art smoke grenade launch system is that the capacity of the launcher is not easily expandable to suit relatively large vehicles.

SUMMARY OF THE INVENTION

According to the present invention, an armored vehicle is provided. This vehicle comprises a body portion; a turret portion; and a smoke grenade launching system; said system having spaced first and second pluralities of grenade launching tubes mounted on the vehicle outside of the turret portion and having a control means, said control means having first and second switches mounted on the vehicle inside the turret portion; said control means having a plurality of tube energizers respectively connected to the launching tubes; said control means having a first circuit portion connecting the first switch to a first group of the first and second pluralities of tube energizers and having a second circuit portion connecting the second switch to a second group of the first and second pluralities of tube energizers.

By using the first and second circuit portions, the problem of not having a dual-salvo launching system is eliminated. By using the spaced pluralities of grenade discharge tubes having the multiple circuit portions, the problem of not having an easily expandable launching system is avoided.

The foregoing and other objects, features and advantages will be apparent from the following description of the preferred embodiment of the invention as illustrated in the accompanying drawings.

DESCRIPTION PREFERRED

Figure 1:
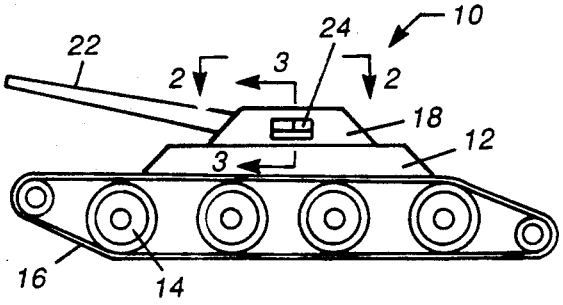
FIG. 1 is an elevation view of an armored vehicle having a smoke grenade launching system according to the present invention.

As shown in FIG. 1, an armored vehicle 10 is provided. Vehicle 10 includes a main body portion 12, a plurality of wheels 14, threads 16, a turret 18 which has a hatch door 20, a gun 22, and a smoke grenade system 24.

Figure 2:
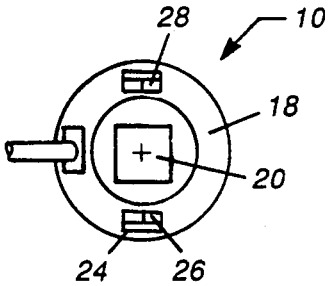
FIG. 2 is a partial plan view as taken along the line 2—2 of FIG. 1.

As shown in FIG. 2, system 24 includes a left grenade launcher 26 and a right grenade launcher 28. Launchers 26, 28 are mounted on turret 18 on the outside thereof and on opposite sides thereof. System 24 also includes a control circuit 30 for energizing parts of the launchers 26, 28 in a selective manner.

Figure 4:
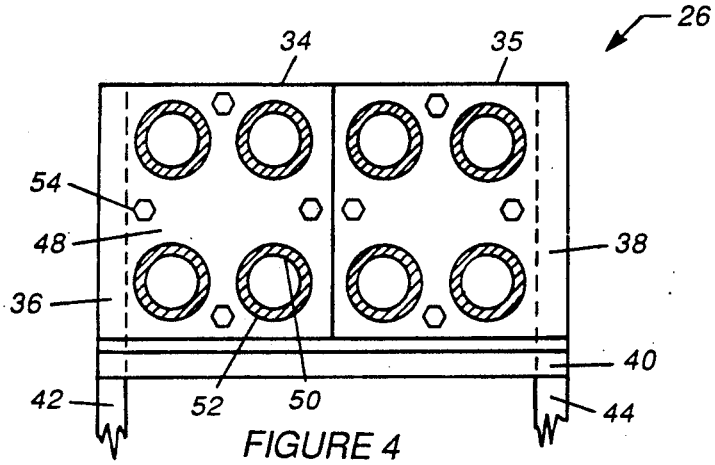
FIG. 4 is a section view as taken along the line 4—4 of FIG. 3.
Figure 3:
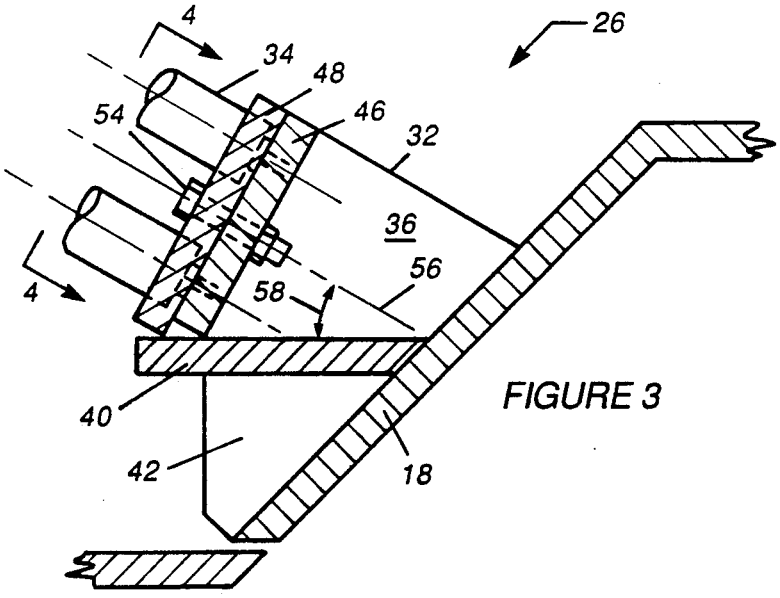
FIG. 3 is a section view as taken along the line 3—3 of FIG. 1.

As shown in FIGS. 3 and 4, left launcher 26, which is identical to right launcher 28, has a welded bracket 32, and has two pluralities of electrically energized four-tube units or subassemblies 34, 35, which are mounted on bracket 32. Bracket 32, which is welded to turret 18, has first and second upper end plates 36, 38, a horizontal plate 40, and first and second lower end plates 42, 44, which are below horizontal plate 40. Bracket 32 also has a single-piece sloping mounting plate 46. Tube unit 34, which is identical to tube unit 35, has a base plate 48, which has four holes 50 for four smoke grenade tubes 52, and has four bolts 54 for interconnecting plates 46, 48. Four-tube unit 34 has a centerline 56, which has a vertical angle 58 of about 25 degrees. In this embodiment, tubes 52 are parallel. Tubes 52 can alternately be spaced apart, at an angle, in a sloping plane passing through the axes of each horizontal row of tubes, such as a 15 degree angle between adjacent tube axes, or the like.

Figure 5:
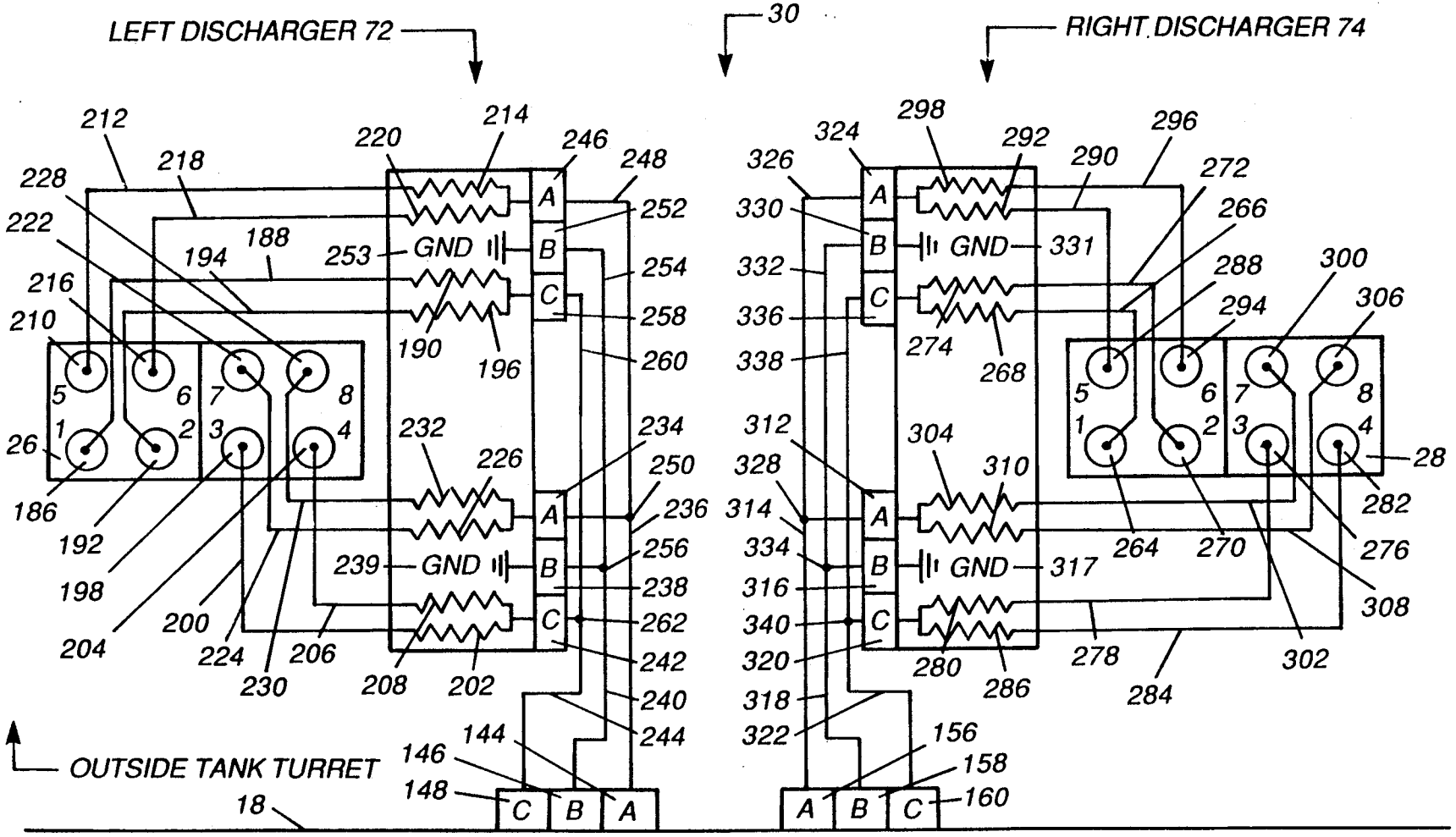
FIG. 5 is an upper part of a circuit diagram of the smoke grenade launching system.
Figure 6:
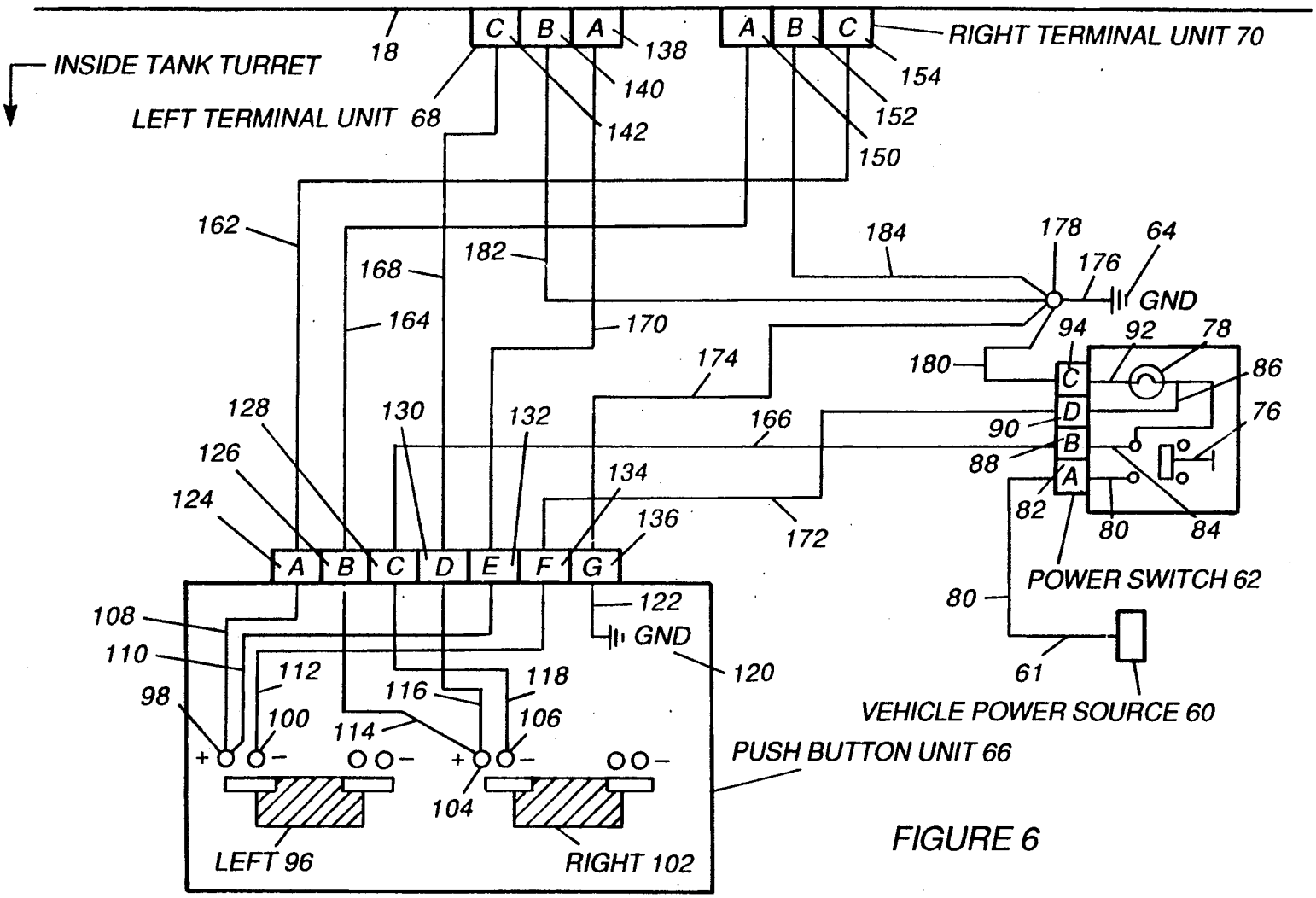
FIG. 6 is a lower part of the circuit diagram of the smoke grenade launching system.

As shown in FIGS. 5 and 6, control circuit 30 has a vehicle power source 60 with an output terminal 61, a power switch unit 62, a master ground 64, a pushbutton or switch unit 66, left and right terminal units 68, 70, and left and right electrical discharger units 72, 74.

Power switch unit 62 has a switch device 76, an indicator 78, an input conductor 80 from terminal 61 to an A terminal 82, two output conductors 84, 86 from respective B and D terminals 88, 90, and a ground conductor 92 from a C terminal 94.

Pushbutton unit 66 has a left switch button 96, which has left and right contacts 98, 100, and has a right switch button 102, which has left and right contacts 104, 106. Contact 98 has output conductors 108, 110. Contact 100 has output conductor 112. Contact 104 has output conductors 114, 116. Contact 106 has output conductor 118. Pushbutton unit 66 also has a ground 120 which has a conductor 122.

Pushbutton unit 66 also has an A terminal 124 which connects to conductor 108, a B terminal 126 which connects to conductor 114, a C terminal 128 which connects to conductor 118, a D terminal 130 which connects to conductor 116, an E terminal 132 which connects to conductor 110, an F terminal 134 which connects to conductor 112, and a G terminal 136 which connects to conductor 122.

As shown in FIGS. 5 and 6, turret left terminal unit 68 has an inner A terminal 138, an inner B terminal 140, an inner C terminal 142, an outer A terminal 144, an outer B terminal 146, and an outer C terminal 148. Terminals 138, 140, 142 respectively connect to terminals 144, 146, 148.

Turret right terminal unit 70 has an inner A terminal 150, an inner B terminal 152, an inner C terminal 154, an outer A terminal 156, an outer B terminal 158, and an outer C terminal 160. Terminals 150, 152, 154 connect respectively to terminals 156, 158, 160.

Pushbutton A terminal has a conductor 162 which connects to turret terminal 154. B terminal 126 has a conductor 164 which connects to turret terminal 150. C terminal 128 has a conductor 166 which connects to switch terminal 88. D terminal 130 has a conductor 168 which connects to turret terminal 142. E terminal 132 has a conductor 170 which connects to turret terminal 138. F terminal 134 has a conductor 172 which connects to switch terminal 90. G terminal 136 has a conductor 174. Master ground 64 has a conductor 176 which connects to junction 178 that connects to conductor 174. Junction 178 also has a conductor 180 which connects to switch C terminal 94, and has a conductor 182 which connects to turret terminal 140, and has a conductor 184 which connects to turret B terminal 152.

As shown in FIGS. 5 and 6, left discharger 72 has a conventional number 1 tube energizer 186 which has a conductor 188 that has an end resistor 190. Discharger 72 has a number 2 tube energizer 192 which has a conductor 194 that has an end resistor 196. Discharger 72 has a number 3 tube energizer 198 which has a conductor 200 that has an end resistor 202; and has a number 4 tube energizer 204 which has a conductor 206 that has an end resistor 208. Discharger 72 has a number 5 tube energizer 210 which has a conductor 212 that has an end resistor 214; and has a number 6 energizer 216 which has a conductor 218 that has an end resistor 220. Discharger 72 has a number 7 energizer 222 which has a conductor 224 that has an end resistor 226; and has a number 8 energizer 228 which has a conductor 230 that has an end resistor 232.

Left discharger 72 has a lower A terminal 234, which connects at its output to respective resistors 226, 232 and which has an input conductor 236 that connects to turret terminal 144; and has a lower B terminal 238, which connects at its output to ground 239 and which has an input conductor 240 that connects to turret terminal 146. Discharger 72 also has a lower C terminal 242 which connects at its output to respective resistors 202, 208 and which has an input conductor 244 that connects to turret terminal 148; and has an upper A terminal 246 which connects at its output to respective resistors 214, 220, and which has an input conductor 248 that connects to junction 250 in conductor 236. Discharger 72 also has an upper B terminal 252 which connects at its output to ground 253 and which has an input conductor 254 that connects to junction 256 of conductor 240; and has an upper C terminal 258 which connects at its output to respective resistors 190, 196 and which has an input conductor 260 that connects to junction 262 of conductor 244.

As shown in FIGS. 5 and 6, right discharger 74 has a conventional number 1 tube energizer 264 which has a conductor 266 that has an end resistor 268; and has a number 2 tube energizer 270 which has a conductor 272 that has an end resistor 274. Discharger 74 also has a number 3 tube energizer 276 which has a conductor 278 that has an end resistor 280; and has a number 4 tube energizer 282 which has a conductor 284 that has an end resistor 286. Discharger 74 also has a number 5 tube energizer 288 which has a conductor 290 that has an end resistor 292; and has a number 6 tube energizer 294 which has a conductor 296 that has an end resistor 298. Discharger 74 also has a number 7 tube energizer 300 which has a conductor 302 that has an end resistor 304; and has a number 8 tube energizer 306 which has a conductor 308 that has an end resistor 310.

Right discharger 74 has a lower A terminal 312 which connects at its output to respective resistors 304, 310 and which has an input conductor 314 that connects to turret terminal 156; and has a lower B terminal 316 which connects at its output to ground 317 and which has an input conductor 318 that connects to turret terminal 158. Discharger 74 also has a lower C terminal 320 which connects at its output to respective resistors 280, 286 and which has an input conductor 322 that connects to turret terminal 160; and has an upper A terminal 324 which connects at its output to respective resistors 292, 298 and which has an input conductor 326 that connects to a junction 328 of conductor 314. Discharger 74 also has an upper B terminal 330 which connects at its output to a ground 331 and which has an input conductor 332 that connects to a junction 334 of conductor 318; and has an upper C terminal 336 which connects at its output to respective resistors 268, 274 and which has an input conductor 338 that connects to a junction 340 on conductor 322.

In operation, left control button 96, when pressed, energizes left numbers 5, 6, 7 and 8 tube energizers 210, 216, 222, 228 and energizes right numbers 1, 2, 3 and 4 tube energizers 264, 270, 276, 282, thereby launching a first salvo of the smoke grenades. Thereafter, right control button 102, when pressed, energizes right numbers 5, 6, 7 and 8 tube energizers 288, 294, 300, 306 and energizes left numbers 1, 2, 3 and 4 tube energizers 186, 192, 198, 204, thereby launching a second salvo of smoke grenades.

The advantages of launching system 24 are indicated hereafter.

A) System 24 provides a multi-salvo system for launching smoke grenades.

B) The spaced plurality of grenade launching tubes 52 with their respective energizers 186, 192, 198, 204, 210, 216, 222, 228 provide an easily expandable system for various types of armored vehicles.

C) System 24 does not require crew members to come out of the armored vehicle for reloading the system for a second salvo of smoke grenades.

D) System 24 is relatively easier to make and is relatively less costly to make than the prior art systems.

While the invention has been described in its preferred embodiment, it is to be understood that the words which have been used are words of description rather than limitation and that changes may be made within the purview of the appended claims without departing from the true scope and spirit of the invention in its broader aspects.

For example, system 10 can be modified to provide more than two salvos of eight grenades each.

Another example is that tubes 52 can be set so that the vertical angle is another angle, instead of a vertical angle of about 25 degrees.

A further example is that tubes 52 can be set so that a horizontal angular spacing between adjacent tubes is an angle of 30 degrees, or other specific angle.

The embodiments of an invention in which an exclusive property or right is claimed are defined as follows:

1. A smoke grenade launching system comprising:

an armored vehicle having a body portion and a turret portion;

first and second pluralities of smoke grenade launching tubes mounted on the vehicle outside of the turret portion;

first and second switches mounted on the vehicle inside the turret portion;

first and second pluralities of tube energizers respectively connecting to the first and second pluralities of smoke grenade launching tubes;

a first circuit portion connecting the first switch to a first group selected from the first and second pluralities of tube energizers; and a second circuit portion connecting the second switch to a second group remaining in the first and second pluralities of tube energizers.

2. The system of claim 1, wherein each of the first and second pluralities of tubes have eight tubes;

said eight tubes being formed by two side-by-side four-tube units; and said eight tubes being arranged in two horizontal rows of four tubes each, for ease of expansion.

3. The system of claim 1, wherein said first plurality of tubes are mounted on a left side of the turret portion; and said second plurality of tubes are mounted on a right side of the turret portion.

4. The system of claim 1, wherein the first and second switches connect to a vehicle power source output conductor through a power switch unit.

5. The system of claim 1, wherein the first circuit portion has a first plurality of turret portion outer terminals respectively connecting to a first plurality of turret portion inner terminals; and the second circuit portion has a second plurality of turret portion outer terminals respectively connecting to a second plurality of turret portion inner terminals.

6. The system of claim 4, wherein each plurality of turret portion outer terminals includes two outer terminals; each of said two outer terminals having two conductors; each conductor connecting to four energizers.

7. The system of claim 5, wherein each plurality of turret portion inner terminals includes a pair of inner terminals; each said pair of inner terminals having respective first and second conductors, the first conductor connecting to the first switch, and the second conductor connecting to the second switch.

8. A smoke grenade launching system comprising:

a first plurality and a second plurality of launching tubes;

a first plurality and a second plurality of tube energizers respectively connected to the tubes;

first and second switches;

a first circuit portion connecting the first switch to a first group of tube energizers, said first group of tube energizers including one-half of the first plurality of tube energizers plus one-half of the second plurality of tube energizers; and a second circuit portion connecting the second switch to a second group of tube energizers, said second group of tube energizers including the remainder of the first plurality of tube energizers plus the remainder of the second plurality of tube energizers.

* * * * *